Jan. 12, 1971  T. O. PAINE, ACTING  3,554,647
ADMINISTRATOR OF THE NATIONAL AERONAUTICS
AND SPACE ADMINISTRATION
SPECTROSCOPE EQUIPMENT USING A SLENDER CYLINDRICAL
REFLECTOR AS A SUBSTITUTE FOR A SLIT
Filed Dec. 27, 1968
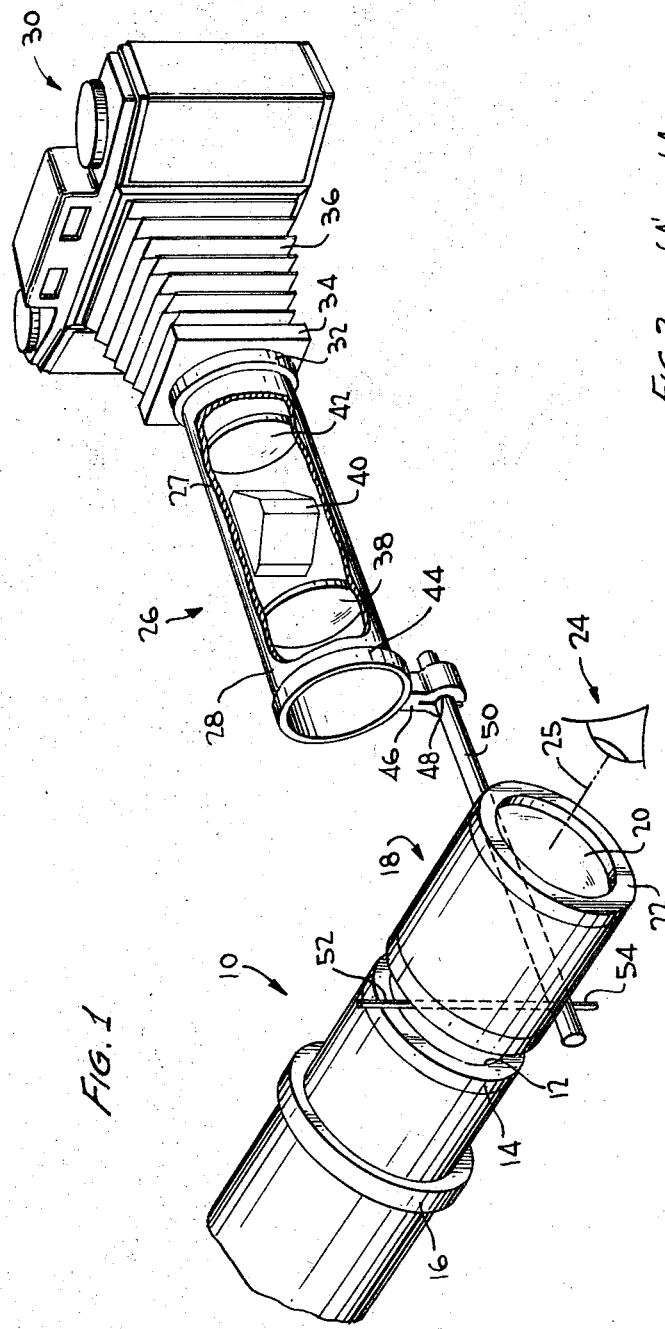
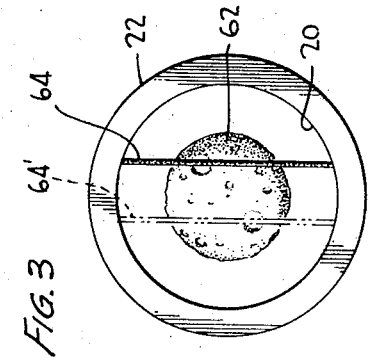
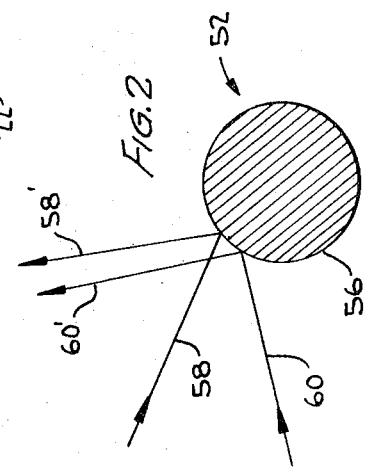
INVENTORS,
RALPH A. GOODWIN
EDGAR D. HALL
BY
ATTORNEYS

United States Patent Office 3,554,647
Patented Jan. 12, 1971

3,554,647
SPECTROSCOPE EQUIPMENT USING A SLENDER CYLINDRICAL REFLECTOR AS A SUBSTITUTE FOR A SLIT
T. O. Paine, Acting Administrator of the National Aeronautics and Space Administration, with respect to an invention of Ralph A. Goodwin and Edgar D. Hall, Annapolis, Md.
Filed Dec. 27, 1968, Ser. No. 787,393
Int. Cl. G01j 3/40, 3/42
U.S. Cl. 356—76
6 Claims

ABSTRACT OF THE DISCLOSURE

In a spectrometer for use in analyzing a portion of light emitted from a relatively large light source comprising a cylindrical, highly polished metallic member the size of a common needle located at the focal plane of an achromatic collimator of the spectrometer, the cylindrical member being adjustably situated in the path of a light source of relatively large area, said cylindrical member being illuminated by a portion of said light source, said cylindrical member reflecting a portion of said light source in a narrow beam configuration suitable for collimation.

---

The invention described herein was made in the performance of work under a NASA contract and is subject to the provisions of Section 305 of the National Aeronautics and Space Act of 1958, Public Law 85–568 (72 Stat. 435; 42 USC 2457).

The present invention relates to the production of a narrow beam of light and, more specifically, to a small diameter convex reflecting member for resolving a wide angle source of light into a narrow beam configuration suitable for analysis by a spectrometer.

Heretofore, a prior art spectrometer assembly typically included a slit source provided at the focal plane of an achromatic collimator. The assembly was placed directly in the path of a light beam to be analyzed, a small portion of the beam illuminating the slit and being transmitted therethrough in a narrow beam configuration. In many applications, the available space directly in the path of the light beam to be analyzed was mechanically inaccessible for placement of a spaced slit source and collimator. One such application involves the use of a spectrometer for analyzing the light emanating from a celestial image formed by a telescope. A celestial image thus formed is often brightened by an image intensifier, commonly known in the prior art as an image converter, which may be placed immediately behind the telescope and spaced a very short distance therefrom. It has been proposed to interpose a slit source in the narrow space separating the telescope and image converter. However, a prior art slit source is too bulky for such an application. The present invention, developed in response to this existing problem, may take the form of a cylindrical polished needle which is readily interposed between the telescope and the image converter, the convex surface of the needle being illuminated by a relatively wide angle beam of light emanating from the image formed by the telescope. The convex cylindrical surface of the needle reflects the wide angle incident light beam into a narrow beam of light suitable for collimation, thereby functioning as an effective substitute for a slit source of a spectrometer. Additionally, since the wide angle beam of light is diverted from the optical axis of the telescope, the cylindrical needle according to the invention enables the use of a less complicated spectrometer optical system than heretofore possible in a limited space environment.

It is often advantageous to visually observe the brightened image formed by the telescope while simultaneously obtaining a spectral reading of a portion of the light emanating from the image. A prior art slit source impressed over the image would preclude its observation except for a small area observable through the slit. The convex mirror according to the invention obscures only a small portion of the image, the mirror appearing to a viewer of the telescope as a hairline shadow impressed over the image. As a result, use of the present invention enables simultaneous viewing of an image while obtaining the spectral analysis of a portion of the light emanating from the image.

A further advantage derived from the present invention is attributed to its mounting for adjustable movement transversely of the image formed by a telescope. An observer of the image may desire to obtain a spectral analysis of a selected portion of the image. This may be easily accomplished by accurately positioning in cylindrical needle until it appears as a hairline shadow over the selected portion of the image to be analyzed. By way of example, if the image formed by the telescope is comprised of a number of celestial bodies, spectral analysis of a selected one of the bodies may be accomplished by properly positioning the cylindrical needle over the selected portion of the image as described.

Accordingly, it is an object of the invention to provide a structure for resolving a beam of light into a narrow beam configuration suitable for collimation in a spectrometer apparatus.

A further object of the invention is to provide a substitute for a slit source of a spectrometer.

Still a further object of the invention is to provide a convex reflecting mirror of small radius for resolving a wide angle beam of light into a narrow beam.

Yet a further object of the invention is to provide a convex reflecting surface which is adjustable transversely of a beam of light for resolving a selected portion of the beam into a narrow configuration suitable for analysis by a spectrometer.

A still further object of the invention is to provide a narrow beam light source which is adjustable transversely of a light beam emanating from an image, the position of said source being indicated by a hairline shadow superimposed upon the image.

Other objects and many attendant advantages of the invention will become obvious upon a perusal of the following detailed description thereof taken in conjunction with the accompanying drawings, wherein:

FIG. 1 is a perspective, partially broken away, and illustrating a spectrometer according to the invention and shown in conjunction with a telescope and image converter, FIG. 2 is an enlarged cross-section of a convex cylindrical mirror of the spectrometer illustrated in FIG. 1, and further illustrating a diagrammatic representation of a plurality of light rays reflected from the mirror into a narrow beam, and FIG. 3 is a pictorial representation of a celestial image formed at the eyepiece of the image converter, as shown in FIG. 1, and further illustrating a hairline shadow impressed over the celestial image and formed by the curved cylindrical mirror of the spectrometer particularly illustrated in FIG. 1.

With more particular reference to FIG. 1 of the drawings, an end portion of a telescope is indicated generally at 10 and includes an eyepiece 12, secured within a surrounding ring 14, which defines the terminal end of the telescope 10. A second ring 16, surrounding the end portion of the telescope, is illustrated to represent the location of a telescoping joint of the telescope 10. According to the concept embodied in the invention, the telescope 10 is particularly employed for celestial observation and, accordingly, in operation, the telescope 10 forms a selected celestial image at the eyepiece 12. Due to the low intensity light emanating from the celestial body under observation, the image formed at the eyepiece 12 is usually of poor contrast. To permit easier visual inspection of the telescope image, it is common to employ an image converter for brightening the telescope image formed at the telescope eyepiece 12. Accordingly, as shown generally at 18, an image intensifier is placed in close proximity to the telescope eyepiece 12. The intensifier includes an eyepiece 20 which is secured within a surrounding ring 22 that is affixed to the terminal end of the intensifier 18. The image formed at the telescope eyepiece 12 appears in a brightened condition at the intensifier eyepiece 20, allowing easier visual inspection by a viewer of the telescope, which viewer is symbolically indicated at 24, rearwardly of the image brightener eyepiece 20, and along the optic axis 25 of the telescope 10. As an example of the apparatus illustrated, the telescope 10 may be a 16-inch telescope having an approximate eyepiece diameter of 2 inches.

To obtain a spectral analysis of a light beam emanating from the celestial image formed at the telescope eyepiece 12, it must be resolved into a narrow beam configuration prior to its analysis by a spectrometer. It has heretofore been contemplated to interpose a spectrometer slit source between the telescope eyepiece 12 and the image intensifier 18. However, no slit source available in the prior art is of sufficient small size to fit in the narrow space separating the telescope and the image intensifier. Additionally, a prior art slit source impressed over the telescope eyepiece 12 would obviously impair visual observation of the image by the viewer, indicated at 24. Further, to obtain a spectral reading of the light emanating from the telescope image, a prior art spectrometer would have to be placed directly along the optical axis 25 of the telescope, thereby further impairing visual observation of the telescope image by a viewer.

The present invention eliminates the need by bulky spectrometer apparatus along the optic axis 25 of the telescope, thereby permitting unimpaired observation of the telescope image at all times by a viewer. The present invention also provides a structure which resolves a beam of light into a narrow beam configuration suitable for collimation, which structure is less bulky and simpler in construction than a prior art spectrometer slit source.

More particularly, with reference to FIG. 1, a simplified spectrometer optical system is shown generally at 26 and comprises a photographic lens tube 28, which is removably secured to a camera 30. The photographic lens tube 30 may be of any type well known in the prior art for containing a lens attachment for a camera. The particular photographic lens tube illustrated in the figure, is provided with an internally threaded ring 32 which is threadably secured to an objective lens holder 34 of the camera 30. The camera 30 is of the type which advantageously includes an adjustable bellows portion 36 for adjustably positioning its objective lens holder 34.

For the purposes of illustration, the tube 28 is shown partially broken away at 27 to expose an achromatic collimator lens 38, positioned within the tube 28 immediately in front of a prism 40, which, in turn, is positioned in ront of a focusing lens 42, also disposed within the tube 28. The collimator lens 38, the prism 40 and the focusing lens 42 are secured in fixed positions within the tube 28 and together comprise the well-known optical system of a spectrometer in its most simplified form.

A Lucite ring 44 is secured by adhesive, for example, to the foremost terminal end of the photographic lens tube 28, as particularly shown in FIG. 1. The Lucite ring 44 supports at its outer periphery thereof a Lucite arm 46, which may be secured to the ring 44 in any well-known manner. The arm 46 is provided with a bore 48 receiving one end of a small diameter Lucite rod 50. It should be understood that the Lucite rod 50 may be secured to the Lucite ring 44 by any number of methods. For example, the rod may be adhesively secured directly to the Lucite ring 44, the rod being sufficiently light in weight to obviate the need for the supporting arm 46.

The opposite end of the Lucite rod 50 has affixed thereto a polished, generally cylindrical small diameter needle 52. The needle 52 may advantageously be a common polished sewing needle, the point 54 thereof being pierced through the end portion of the rod 50 to affix the needle thereon. Obviously, any other suitable polished member having a cylindrical surface of small radius curvature will suffice as a substitute for the particularly illustrated sewing needle. As shown in the drawing, the needle 52 is maintained on the Lucite rod 50 at precisely the focal plane of the achromatic collimator lens 38, and in an extended upright position interposed in the small space separating the telescope eyepiece 12 and the image converter 18. It was found that the extended length of a common sewing needle is sufficient to span the entire approximate 2 inch diameter of the telescope eyepiece 12.

The specific operation of the illustrated invention will become clear upon further reference to FIG. 1 and to FIG. 2 illustrating a greatly enlarged cross-section of the cylindrical needle 52, the surface of which is capable of reflecting a wide angle beam of light into a narrow beam configuration. With more particular reference to FIG. 2, the needle 52 provides a cylindrical convex reflecting surface 56 extending along the entire length of the needle which spans the telescope eyepiece 12. With reference yet to FIG. 2, a pair of light rays 58 and 60 diagrammatically represent a portion of a light beam emanating from a celestial image formed at the telescope eyepiece 12. The light rays 58 and 60 are incident upon the cylindrical convex surface 56 of needle 52 and are specifically reflected therefrom so as to form a beam of light of quite narrow configuration and defined by a pair of rays 58' and 60', the incident light ray 58 being resolved upon reflection to the reflected ray 58', and the incident light ray 60 being resolved upon reflection to the reflected ray 60'. For clarity of illustration, the light rays 58 and 60 are shown as converging at a greatly exaggerated angle, and the reflected rays 58' and 60' are illustrated as diverging, similarly at a greatly exaggerated angle. In actual practice, however, the light beam emanating from the image at the eyepiece 12 and incident upon the mirror 52 converges only slightly. Similarly, the narrow reflected beam of light diverges only slightly, and is therefore suitable for spectral analysis by the apparatus particularly illustrated in FIG. 1. With reference to both FIGS. 1 and 2, the narrow beam of light defined by the reflected rays 58' and 60' is diverted by the reflecting surface 56 of the needle 52 from the optical axis of the telescope and through the spectrometer optical system 26. More particularly, the narrow beam of light is diverted sequentially through the Lucite ring 44, affixed to the foremost end of the tube 28, the achromatic collimator lens 38, which divides the narrow beam into a plurality of parallel rays, the prism 40 which produces the requisite spectral pattern of the narrow beam, and the focusing lens 42, which presents the spectral pattern to the optical system of the camera 30, which camera is supplied with color film for providing a suitably permanent recording of the spectral pattern.

Accordingly, it is apparent that the apparatus described provides a simple spectrometer apparatus which has several advantages over the prior art. More specifically, the cylindrical reflecting needle 52, provding an effective substitute for a prior art slit source, is less bulky than a prior art slit source, enabling its use in an environment of limited avilable space. Additionally, the needle 52 resolves a relatively wide angle beam of light into a narrow beam configuration, enabling spectral analysis of a larger beam sample than heretofore available in the prior art.

The optical system 26 of the illustrated spectrometer is simple in form and obviates the need for a complicated optical system to permit the telescope viewer a relatively unimpeded view of the telescope image. More specifically, FIG. 3 of the drawings illustrates with particularity the relatively unimpeded view observed by the viewer of the telescope 10. With reference to FIG. 3, taken in conjunction with FIG. 1, the viewer 24 observes through the intensifier eyepiece 20 a brightened celestial image, such as a moon image, indicated by the numeral 62. The extended length of the needle 52 which spans the telescope eyepiece 12 appears as a dark hairline shadow 64 impressed over the moon image 62. The location of the hairline shadow 64 precisely indicates to the viewer 24 the exact portion of the light beam emanating from the moon image 62 which is being reflected by the needle 52 for analysis by the spectrometer optical system 26.

If the viewer desires to obtain a spectral analysis of the light emanating from another portion of the moon image 62, for example the area defined between the phantom lines 64', the reflecting needle 52 may be readily repositioned, transversely of the image formed by the telescope and within the narrow space separating the telescope eyepiece 12 and the image converter 18, until the hairline shadow 64 is impressed over the area defined between the phantom lines 64'. For example, such repositioning of the needle 52 is accomplished by mounting the camera on a tripod which is provided with the well-known, commercially available rack and pinion camera position adjustment. Accordingly, selective positioning of the needle 52 is accomplished by mounting the camera such that adjustment of the rack and pinion mechanism will cause displacement of the camera along the major axis of the optical system 21. It should be obvious upon observation of FIG. 1, that the optical system 26 and Lucite rod 50 supporting the needle 52 are simultaneously moved, upon such adjustment of the camera, thereby obviating the need for refocusing the camera. Accordingly, no additional repositioning of the needle 52, the collimator lens 38, the prism 40 or the focusing lens 42 is required.

In practice, the eyepiece 12 of the telescope may be removed prior to placement of the needle 52 to enable an even clearer spectral image to be formed. Accordingly, to facilitate visual inspection of the telescope image, the image intensifier 18 may be substituted in place of the telescope eyepiece 12. Accordingly, in practice the eyepiece 12 and the image intensifier 18 are used interchangeably on the telescope.

Thus, the above described invention provides a simplified spectrometer apparatus which is less bulky than those available in the priort and is useful in many applications which heretofore required more complex systems.

Although a preferred embodiment of the invention has been described and shown, it should be understood that many other embodiments and modifications thereof will become apparent without departing from the spirit of the invention as defined within the scope of the appended claims, wherein:

What is claimed is:

1. A spaced needle spectrometer apparatus for obtaining the spectral pattern of light emanating from the image formed by a telescope, comprising: a telescope for producing an image; an image converter adjacent to the terminal end of said telescope; an achromatic collimator and a prism comprising an optical system for forming a spectral pattern of a portion of the light emanating from said image; reflecting means of slender cylindrical shape interposed between said telescope and said image converter to divert a portion of the light emanating from the image from the optical axis of the telescope into a narrow beam for collimation by said collimator while allowing viewing of the image through the image converter; and mounting means for fixedly positioning said reflecting means at the focal plane of said collimator, and for mounting said prism at a fixed distance from said collimator.

2. The invention as recited in claim 1, and further including: means for adjustably positioning said reflecting means transversely of the image in order to obtain a spectral pattern of a selected portion of the light emanating therefrom.

3. The structural features as recited in claim 1, wherein said mounting means comprises a photographic lens tube containing said collimator and said prism, and a rod secured to said lens tube for supporting said reflecting means.

4. The structure as recited in claim 3, and further including: a camera for recording the spectral pattern, said lens tube being operatively attached to said camera; said collimator and said prism comprising an optical system for said camera.

5. The structure as recited in claim 4, wherein said camera is provided with expansible bellows comprising said means for adjustably situating the reflecting means.

6. In combination, a telescope including an eyepiece at which an image is formed, a spectrometer for obtaining a spectral pattern of the light emanating from the image, said spectrometer including a slender convex mirror of cylindrical configuration spanning the eyepiece of said telescope and reflecting a portion of the light emanating from the image into a narrow beam configuration suitable for analysis by said spectrometer.

References Cited
UNITED STATES PATENTS

| | | | |
|---|---|---|---|
| 2,179,657 | 11/1939 | Estey | 356—76 |
| 3,359,850 | 12/1967 | Baird | 356—86 |

RONALD L. WIBERT, Primary Examiner

V. P. McGRAW, Assistant Examiner

U.S. Cl. XR

250—226; 356—96